Patented Apr. 7, 1942

2,279,199

UNITED STATES PATENT OFFICE 2,279,199

CATALYTIC CONVERSION OF HYDROCARBONS

Walter F. Huppke, Lomita, Calif., assignor to Union Oil Company of California, Los Angeles, Calif., a corporation of California No Drawing. Original application January 8, 1937, Serial No. 119,629. Divided and this application February 21, 1939, Serial No. 257,665

17 Claims. (Cl. 260—683)

This invention relates to use of catalysts having high activity for catalytic dehydrogenation or kindred catalytic processes and the like, for example for the dehydrogenation of isobutane, n-butane, propane, cyclohexane and similar materials whereby unsaturates and aromatics and the like may be obtained for the purposes of production of solvents, motor fuels, and similar substances.

This application is based upon my co-pending application, Serial No. 119,629, filed January 8, 1937, and is a division thereof.

I have discovered that uranium oxide or vanadium oxide, when used in conjunction with other appropriate materials, is a highly valuable dehydrogenating catalyst for the dehydrogenation of various organic materials such as isobutane, n-butane, propane, cyclohexane and similar materials obtained from petroleum. I have also discovered, however, that, while uranium oxide or vanadium oxide is a highly active agent for these purposes, it does not function efficiently if used alone, and it becomes desirable if not necessary to employ it in conjunction with another material which serves to disperse the uranium or vanadium oxide and to impart body and a suitable gel-type structure of a more or less vitreous character. For this purpose, aluminum oxide, zirconium oxide or thorium oxide, or mixtures of these, may be employed. Again greater efficiency may be obtained by employing, in addition to the dispersing or bodying agent, an agent to activate and prolong the life of the catalyst. For this purpose, zinc oxide is outstanding in that it imparts much longer life to these catalysts here described and tends to increase their efficiency and the rate of conversion.

The most satisfactory catalyst according to this invention, comprises three types of constituents as follows: (1) The primary or active agent in the form of uranium oxide; (2) a dispersing and bodying agent or distender for the catalyst having the property of imparting a more adequate gelatinous or "gel" structure such as aluminum, zirconium, or thorium oxide or mixtures of these oxides; (3) an agent to activate and prolong the life of the catalyst, particularly zinc oxide. Either the oxide for dispersing the catalyst or the activating and life-prolonging agent may be omitted or both may be omitted, where it is desired to dispense with either or both of their functions.

Broadly stated, the invention resides in the dehydrogenation and other types of thermal conversion of organic compounds, particularly hydrocarbons, with a catalyst comprising uranium oxide and a dispersing bodying agent for increasing the gel character of the catalyst, of which aluminum, zirconium and thorium oxides comprise the class. The invention further comprises such use of uranium oxide in combination with an oxide such as zinc oxide to increase the life of the catalyst, both where a dispersing and bodying oxide is included and where it is not included.

Aside from those aspects of the invention outlined above, I have also discovered that vanadium oxide is ordinarily a good substitute for uranium oxide as the primary or active agent. Where vanadium oxide is employed, the other constituents of the catalyst will be employed in the same respects as above described with respect to uranium oxide, zinc oxide being used as the added promoting or activating or life-prolonging agent and aluminum, zirconium and thorium oxides being used as bodying or distending agents. The invention therefore also resides in the conversion of hydrocarbon and kindred organics with catalysts where either of the group consisting of vanadium oxide and uranium oxide is used as the principal catalyst, in conjunction with the dispersing or bodying agent or with the activating or life-prolonging agent, or with both types of agents. The invention also extends to such use of a mixture of uranium and vanadium oxides as a catalyst, with or without the other types of agents.

In a preferred form of the invention the reduced forms of uranium and vanadium oxides are preferred as being more efficient. The reason for this preference is that in the presence of hydrocarbon gases to be treated in the presence of the catalyst, for example for dehydrogenation purposes, when the higher oxide forms are used they are readily reduced and in many instances the oxygen acts upon the hydrocarbons to form objectionable materials, such as gummy constituents which contaminate the catalysts and greatly reduce their efficiency. Of course in instances where such objectionable materials are not produced or do not affect the catalyst, the higher oxide form could be employed.

Considering the practice of this invention, the oxides mentioned may be produced in various ways. The preferred procedure resides in precipitating the hydroxides (or perhaps more properly the hydrous oxides) from solutions of the salts of the metals being employed, this precipitation being preferably effected with ammonium hydroxide. For example, solutions of mixed nitrates or chlorides of the various metals involved are commingled with ammonium hydroxide solution whereby the corresponding hydrated oxides are precipitated. More specifically, such soluble salts of the metals are dissolved in water to yield about a 2% solution. This solution usually will be heated to the boiling point and then the dilute aqua ammonia slowly added until precipitation is complete. Most of these hydrous oxides are precipitated in the pH range of 3 to 5. The supernatant liquid is drawn off as the precipitate is settled and the slurry is then transferred to a Buchner funnel or the like and repeatedly washed or filtered until no more electrolyte can be removed. At this point the material usually tends to remain in suspension in finely divided form when stirred into water, and when in this fine state may be termed "peptized."

These gelatinous precipitates are very adsorptive and by reason of that characteristic may have a small amount of a promoter added thereto in some other form than the form of these gelatinous precipitates themselves, should it be so desired. For example, if a vanadium or uranium salt had not been employed in the precipitation of the hydrous oxides, ammonium metavanadate or uranyl chloride solution may be stirred into the gelatinous mass or suspension whereby the salt will be adsorbed or absorbed by the carrier gel. This procedure may be employed as a means to add the principal catalyst to the mass, or to add the second principal catalyst thereto if both uranium and vanadium are to be employed.

After the gelatinous hydrous oxide precipitate has been prepared, the filter cake is allowed to dry at temperatures around 135° to 150° F. until hard vitreous lumps form. In this drying operation, the gel shrinks to about 5 to 10% of its original wet volume. The lumps so obtained are then broken up and screened, preferably to pass 10 mesh but to stay on a 20 mesh screen. These gel granules are then heated up to temperatures in the order of 650° F. in a large electric tube heater and dry air is slowly passed thereover. With this treatment the gel will shrink approximately one-third more and reach its final volume.

In this form the catalyst constitutes a mixture of higher oxides of uranium and/or vanadium and zinc or such of these as may be employed, such oxides being distributed throughout the aluminum, zirconium or thorium carrier oxide.

The irreducible refractory oxides, that is those of aluminum, thorium and zirconium, serve to some extent as diluents of the other oxides but are chiefly used because they improve the physical characteristics of the catalysts. These oxides all yield gelatinous precipitates when dilute ammonia is added to a dilute solution of their soluble salts. They dry slowly to a hard vitreous gel. These gels adsorb gases with great avidity, a very excellent property in the catalyst. When it is desired to incorporate in such a catalyst another ingredient, which of itself does not form gelatinous hydrous oxides, such a gelatinous hydrous oxide of the other ingredient is invariably obtained when co-precipitated with said refractory hydrous oxides. Also, as above indicated, such gelatinous hydrous oxides, when sufficiently washed to remove all electrolytes are then capable of adsorbing in the cold appreciable quantities of other electrolytes which may be desired in the finished catalyst. In addition to those mentioned, vanadyl chloride and nitrate and uranyl nitrate and the like may be stirred into the gel as above described. The gel is then dried. The same oxides are obtainable by heating the dried gel when these solutions are adsorbed in the gel as when originally precipitated with the carrier hydroxides. Other catalytic agents than uranium and vanadium compounds may be adsorbed in gels in the same manner, and a dried gel recovered, which may be used in that form where appropriate, or heated to convert the salt when required. This procedure is particularly desirable for all those catalytic metals which do not easily form insoluble hydrates, which class includes uranium and vanadium. Salts of those metals may be deposited, not only in aluminum, zirconium and thorium gels which are precipitated easily by aqua ammonia from solutions of their salts, but also in the gel of any other metal whose salts readily precipitate gelatinous insoluble hydrates with aqua ammonia.

For some uses it is possible to use the catalyst in the form as produced by the steps above described, the uranium and vanadium oxides being of the higher oxide form. However, for many purposes, if not for most purposes, it is desirable to use catalysts in which such of the uranium and vanadium oxides as are present are in the reduced form, for the reason that in the presence of hydrocarbon gases the higher oxides pass to the reduced form and the oxygen acts to form objectionable materials such as gummy compounds which damage the catalysts and greatly reduce their value.

Therefore in order to obtain the most generally useful form of catalyst, the hard dry gel obtained after drying at 650° F., as above described, is reduced with hydrogen as by placing the gel in a Pyrex or silica tube and passing dry hydrogen gas therethrough while the temperature is being raised to about 850° F. The reduced catalyst thus obtained, without having had access to oxygen, may be then employed to perform its catalytic function. For example, its temperature may be established at any desired operating degree, such as 850° F., and a gas passed therethrough for dehydrogenation thereof, such as isobutane or propane or cyclohexane or other appropriate gas.

In preparing a catalyst, the proportion of the materials used may be varied very widely. According to a satisfactory procedure, a catalyst consisting of uranium or vanadium oxide, aluminum or zirconium or thorium oxide and zinc oxide may be prepared employing roughly equal mol proportions, or in other words portions running about 30 to 40 percent each of such a three unit mixture.

As an example of the use of a catalyst according to this invention, isobutane or cyclohexane or other material adapted to dehydrogenation may be passed in gaseous form through a catalytic body at a temperature of 850° F. to 950° F. at a rate averaging one second contact time. The rate however, will range from a small fraction of one second to possibly several seconds according to the materials being treated and the conditions.

Working under conditions such as these, catalysts of the nature above described have relatively high activity for relatively great lengths of time at reasonable temperatures. For example, a three-constituent catalyst as here described, containing uranium oxide or vanadium oxide in a reduced form, when operating at a temperature of about 850° F. will have a life of about 8 to 10 hours with a maximum conversion on isobutane of about 18%. Under these conditions if the promoting catalyst, that is zinc oxide, is omitted, a maximum conversion of about 15% is obtainable or a reduction of 15% to 20% in activity. Again, if the temperature for the three component catalyst is increased to about 950° its life will be decreased to about 1 to 2 hours, but the conversion ratio will be stepped up to about 30%; and if the operating temperature is increased to 1050° F. the conversion ratio will be nearly doubled but the life of the catalyst will be still further reduced. In each of these instances the presence of 30% to 60% of zinc oxide ordinarily increases the life of the catalyst from 2 to 3 times what it would be in the absence of the zinc oxide.

Thus, from the above statements, it will be apparent that while a catalyst containing only uranium or vanadium oxide and one of the dispersing oxides such as aluminum or zirconium oxide is good in general as a catalyst, its life nevertheless is roughly only one-half to one-third that of the catalyst containing zinc oxide and its activity is around 15% to 20% less than that of the catalyst containing zinc oxide. Of course, it is possible to use uranium or vanadium oxide alone, but the importance of its combination with the various other oxides in the various relationships mentioned is apparent when it is considered that its conversion capacity at 950° F. is only about 8% or 10% and at 1050° F. is only about 20%. Thus it will be seen that the addition of one of the extending or dispersing oxides aluminum, zirconium or thorium oxides, increases the activity as much as 15% to 30%, and the presence of zinc oxide prolongs the life perhaps two to three times as above mentioned.

With respect to the zinc oxide, it is possible that the zinc is present as a complex oxide with the uranium or vanadium oxide, but I do not wish to be bound by any theory that the zinc definitely is present in either of these forms or in some other form.

The examples and illustrations here given are intended to be illustrative only and it is understood that they are not for the purpose of introducing limitations not required by the restrictions of the prior art.

I claim:

1. A method for the dehydrogenation of hydrocarbons which comprises subjecting a hydrocarbon to an elevated temperature in the presence of a catalyst comprising an oxide from the class consisting of uranium and vanadium oxides, such oxide being distributed upon an oxide of the class consisting of aluminum, zirconium and thorium hydrous oxide gels, the catalyst containing a zinc oxide activator.

2. A dehydrogenation method for hydrocarbons comprising subjecting light hydrocarbons to elevated temperatures between about 850° F. and 1050° F. in the presence of a catalyst comprising zinc oxide and an oxide from the class of uranium and vanadium oxides distributed upon an oxide of the class consisting of aluminum, zirconium and thorium oxide gels.

3. A method for the conversion of carbonaceous materials which comprises subjecting the carbonaceous material in vaporous or gaseous form at elevated temperatures in the order of 850° F. to 1050° F. to the action of a catalyst comprising zinc oxide, an oxide of the class consisting of uranium and vanadium oxides and a gel-type oxide of the class consisting of aluminum, zirconium and thorium oxides wherein the zinc oxide approximates 30% to 60% of the catalyst and the other oxides are present in roughly equal molar proportions.

4. A method for the conversion of hydrocarbons comprising subjecting hydrocarbons in gaseous or vaporous form at elevated temperatures to the action of a catalyst comprising a gel-type oxide from a class of aluminum, zirconium and thorium oxides and carrying zinc oxide and an oxide of the class consisting of vanadium and uranium oxides, each of the three oxides being present in substantial proportions.

5. A method for the catalytic thermal conversion of petroleum hydrocarbons to change their hydrogen-to-carbon ratio comprising reacting a hydrocarbon in gaseous or vaporous form at conversion temperatures in the presence of a catalyst comprising a gel carrier from the class consisting of zirconium oxide, aluminum oxide and thorium hydrous oxide gels, and a catalytic agent carried thereby selected from the class consisting of vanadium and uranium oxides, the catalyst containing zinc oxide in activating proportions.

6. A method according to claim 5 wherein the three types of constituents are present in roughly equal molar proportions.

7. A method for the catalytic thermal conversion of hydrocarbons to change their hydrogen-to-carbon ratios which comprises subjecting the hydrocarbon in gaseous or vaporous form to conversion temperatures in the presence of a catalyst comprising a zirconium oxide gel carrier and an active catalytic material carried thereby selected from the class consisting of uranium and vanadium catalytic oxides.

8. A method according to claim 7 wherein the catalyst also contains catalytic zinc oxide in activating proportion.

9. A method according to claim 7 wherein the catalyst contains zinc oxide as a third constituent, and the three constituents of the catalyst are present in roughly equal molar proportions.

10. A method for the conversion of hydrocarbon fractions comprising subjecting the hydrocarbon in the gaseous or vapor form at an elevated temperature in the order of 850° F. to 1050° F. to the action of a catalyst comprising a gel-type hydrous oxide carrier containing a catalytic oxide which has been produced by precipitating a hydrous gel with an alkaline hydroxide from a solution of a water-soluble salt of a metal from the class consisting of aluminum, zirconium and thorium, filtering and washing the resultant gel-type precipitate until no electrolyte can be removed, at that point suspending said gel precipitate in water, stirring into said suspension a solution of a water-soluble salt of a catalytic metal of the class consisting of vanadium and uranium whereby the salt is adsorbed by the gel precipitate, and drying the resultant gel at about 650° F. to 850° F.

11. A conversion method according to claim 10 wherein the catalyst contains zinc oxide.

12. A method according to claim 5 wherein the gel carrier was precipitated as a hydrous oxide from solution and a material yielding the oxide of the catalytic metal was deposited upon the precipitated hydrous oxide gel in its original precipitated wet condition before drying.

13. A method according to claim 7 wherein the zirconium oxide gel was precipitated from solution as a hydrous oxide and a salt solution of the catalytic material was deposited upon the originally precipitated carrier gel while still wet and undried.

14. A method according to claim 1 wherein the catalyst was produced by precipitating the catalyst oxide upon the hydrous oxide gel while the latter was in an undried state.

15. A method for the dehydrogenation of hydrocarbons which comprises subjecting a hydrocarbon to an elevated temperature in the presence of a catalyst comprising an oxide from the class consisting of uranium and vanadium oxides, such oxide being distributed upon an oxide of the class consisting of aluminum, zirconium and thorium hydrous oxide gels, wherein the catalyst was produced by precipitating the catalyst oxide upon the hydrous oxide gel while the latter was in an undried state.

16. A method for the catalytic thermal conversion of petroleum hydrocarbons to change their hydrogen-to-carbon ratio comprising reacting a hydrocarbon in gaseous or vaporous form at conversion temperatures in the presence of a catalyst comprising a gel carrier from the class consisting of zirconium, aluminum and thorium hydrous oxide gels, and a catalytic agent carried thereby selected from the class consisting of vanadium and uranium oxides, wherein the gel carrier was precipitated from solution as a hydrous oxide, and wherein the catalytic metal was deposited upon the precipitated hydrous oxide gel in its original precipitated wet condition before drying.

17. A method according to claim 1 wherein the gel carrier was precipitated from solution and the catalytic metal of said class consisting of uranium and vanadium was deposited upon the gel carrier in a form to yield said catalytic oxides of said class consisting of uranium and vanadium oxides, said form of the catalytic metal being deposited upon the gel carrier while the precipitated gel was still in its original wet and undried state.

WALTER F. HUPPKE.